United States Patent [19]

Beardsley et al.

[11] Patent Number: 4,970,640
[45] Date of Patent: Nov. 13, 1990

[54] DEVICE INITIATED PARTIAL SYSTEM QUIESCING

[75] Inventors: Brent C. Beardsley, Tucson, Ariz.; Eugene P. Hefferon, Poughkeepsie; Kenneth R. Lynch, Rhinebeck, both of N.Y.; Stephen W. Schimke, Tucson, Ariz.; Lloyd R. Shipman, Jr., San Jose, Calif.; Susan M. Wethington, Tucson, Ariz.

[73] Assignee: International Business Machines Corporation, Armonk, N.Y.

[21] Appl. No.: 251,969

[22] Filed: Sep. 26, 1988

Related U.S. Application Data

[63] Continuation-in-part of Ser. No. 90,723, Aug. 28, 1987, abandoned.

[51] Int. Cl.$^5$ ............................................. G06F 13/00
[52] U.S. Cl. .................................... 364/200; 371/11.3
[58] Field of Search ... 364/200 MS File, 900 MS File; 371/7, 11.1, 11.3

[56] References Cited

U.S. PATENT DOCUMENTS

| | | | |
|---|---|---|---|
| 4,014,005 | 3/1977 | Fox et al. | 364/200 |
| 4,070,704 | 1/1978 | Calle et al. | 364/200 |
| 4,099,234 | 7/1978 | Woods et al. | 364/200 |
| 4,195,344 | 3/1980 | Yamazaki | 364/200 |
| 4,207,609 | 6/1980 | Luiz et al. | 364/200 |
| 4,280,176 | 7/1981 | Tan | 364/200 |
| 4,396,984 | 8/1983 | Videki | 364/200 |
| 4,403,288 | 9/1983 | Christian et al. | 364/200 |
| 4,403,303 | 9/1983 | Howes et al. | 364/900 |
| 4,455,605 | 6/1984 | Cormier et al. | 364/200 |
| 4,562,535 | 12/1985 | Vincent et al. | 364/200 |
| 4,574,346 | 3/1986 | Hartung | 364/200 |
| 4,589,063 | 5/1986 | Shah et al. | 364/200 |
| 4,604,690 | 8/1986 | Crabtree et al. | 364/200 |
| 4,649,514 | 3/1987 | Berger | 364/900 |
| 4,660,141 | 4/1987 | Ceccon et al. | 364/200 |

Primary Examiner—Michael R. Fleming
Assistant Examiner—Debra A. Chun

[57] ABSTRACT

A data processing system includes a plurality of host systems and peripheral subsystems, particularly data storage subsystems. Each of the data storage subsystems includes a plurality of control units attaching a plurality of data storage devices such as direct access storage devices (DASD) for storing data on behalf of the various host systems. Each of the control units have a separate storage path for accessing the peripheral data storage devices using dynamic pathing. The storage paths can be clustered into power clusters. Maintenance personnel acting through maintenance panels on either the control units or the peripheral data storage devices activate the subsystem to request reconfiguration of the subsystem from all of the host systems connected top the subsystem. The host systems can honor the request or reject it based upon diverse criteria. Upon each of the host systems approving the reconfiguration, the subsystem 13 is reconfigured for maintenance purposes. Upon completion of the maintenance procedures, a second reconfiguration request is sent to the host systems for causing quiesce devices to resume normal operations.

41 Claims, 4 Drawing Sheets

DEVICE INITIATED PARTIAL SYSTEM QUIESCING

This application is a continuation-in-part of application Ser. No. 090,723, filed Aug. 28, 1987, now abandoned.

DOCUMENTS INCORPORATED BY REFERENCE

U.S. Pat. No. 4,574,346, U.S. Pat. No. 4,396,984, U.S. Pat. No. 4,207,609 and commonly assigned co-pending Patent application No. SN 089151, filed on Aug. 25, 1987.

BACKGROUND OF THE INVENTION

Field of the Invention

The present invention relates to a data processing system using controllers to control the transfer of data from central processing units to peripheral devices. More particularly, the present invention relates to the automatic reconfiguration of a data processing system during operation such that devices can be removed from the system during maintenance with the system automatically reconfiguring itself to continue operation.

Discussion of the Art

As data processing needs of system users grow, the number of peripheral devices supported by a data processing system also grows. Multiple data processing applications require a plurality of various peripheral devices. The term "device", as used herein, includes such components, whether or not directly addressable, as control units, peripheral cache memories, communications apparatus, data storage units such as direct access storage devices (DASD), tape recorders, and the like. It also includes separately maintainable portions thereof as will become apparent. These devices occasionally need maintenance of a type requiring the device to be temporarily disconnected from the data processing system.

The maintenance of peripheral devices has become more difficult as data processing systems become more complex. Often peripheral devices are in rooms or on floors of a building separated from the connected central processing units and device controllers. The maintenance of a particular peripheral device or of a section of devices under the control of one control unit requires the coordination of the operator at the system console together with the maintenance personnel at the control units and/or devices. When a maintenance action is required on a device, the central processing units (CPUs) must first be informed that the maintenance is to take place. Information about the extent of maintenance must be provided to the central processing unit such that the processors can take the necessary action to quiesce, i.e., cease communication with the use of subchannels and channel paths that relate to the portion of the device that is to be maintained "off line". This action is necessary to maintain data integrity.

Several steps must be taken to notify all of the central processing units or host systems of the maintenance action and to determine when the action can be performed. First, a service representative or other maintenance person determines the correlation between the physical portions of the device to be maintained and the device numbers and channel path identifiers that are affected for each attached CPUs. Next, the service representative goes from CPU to CPU and enter appropriate reconfiguration commands at each CPU to quiesce the specified channel paths and I/0 devices. Once a particular device has been electrically disconnected or logically isolated from the system of CPUs, the service representative then performs the required maintenance. Finally, upon completing the maintenance, the service representative goes from CPU to CPU and enters appropriate reconfiguration commands at each central processing unit to give notification that the just-maintained device is again available.

U.S. Pat No. 4,195,344 discloses the use of a monitor center that permits the automatic supervision of the configuration of a data processing system. This patent is representative of the relevant art in that if it is necessary to disconnect or reconnect the devices during the operation of a data processing system for the purpose of maintenance, inspection, or repair, it was necessary to inform the operating system of the connection or disconnection by the use of the identification number of the device. The operator communicates with the data processing system to report the disconnection and to order reconfiguration of the devices for enabling the data processing system to continue operation without the devices. Although this patent disclosed a means for automatically recognizing that an error was made in the connection or reconnection condition of the device back into the system configuration, no mention is made of the system automatically reconfiguring for device maintenance nor is there disclosure of automatic reconfiguration of the system after maintenance is completed.

U.S. Pat. Nos. 4,660,141, 4,604,690, 4,589,063, 4,403,303, and 4,070,704 describe processes for the reconfiguration of data processing systems. Each of these processes requires a reload and reinitialization of the operating system being used in the data processing system. For example, U.S. Pat. No. 4,604,690 discloses a process for the reconfiguration of a data processing system when a device is added to the system. The operating system is reloaded and reinitialized to reconfigure the data processing system to begin communication with the newly added device. Although useful to the addition of a new device to an already present data processing system, such teaching is not helpful when a device must be removed from the system for maintenance.

U.S. Pat. No. 4,207,609 discloses a method for path independent reservation and reconnection of devices to central processing units operating in a multi-CPU and shared device access system environment. Each peripheral control unit has information identifying connected CPUs and their channel attachment. When the control unit is ready to communicate with a given CPU about a given device, it may do so through anyone of several channels which it knows are connected between the given device and given CPU. This patent does not suggest how to temporarily and automatically remove a device from the system when maintenance is required on that device.

SUMMARY OF THE INVENTION

In view of the foregoing, it is the principle object of this invention to improve system reconfiguration apparatus and methods.

Another object of this invention is to improve methods and apparatus for maintenance on data processing systems with a minimal amount of interruption to system operation.

Still another object of this invention is a method and apparatus for system reconfiguration with device independent self-descriptive configuration information.

Still another object of this invention is methods and apparatus for removing peripheral devices of a data processing system during a repair action requiring disconnection of a device from the data processing system.

The other objects of this invention are accomplished by devices having a capability of sending signals to attached systems to request that those systems take the necessary steps to automatically quiesce a particular portion of the device. The signals are initiated by a command entered by maintenance personnel at the device console of the device to be maintained. The device configuration information necessary for the system to automatically quiesce use of a particular portion of the device and thereby automatically reconfigure is provided by the device to the host system. At system initialization, a command is executed on every channel path to obtain subsystem configuration data to create a configuration record in a host system.

An example of an implementation follows. A maintenance service representative desiring to service a device, or portion thereof, enters a maintenance command at a device console or input portion. The command causes a signal requesting attention to be sent by the device to each connected CPU. After each CPU has responded to the attention signal, the device sends to the CPUs information identifying particular portion(s) of the device to be quiesced. The system responds to its system configuration information to automatically perform the necessary temporary reconfiguration. After the reconfiguration has been attempted, a command is executed which describes to the device the result of the reconfiguration attempt. Once the quiesce is effected, the service representative makes the necessary repairs knowing that the system will not attempt to access the particular portion of the device being serviced. After maintenance is completed, another command is entered at the device console, this time activating the device to signal the system to resume use of the previously quiesced portion of the device. The resume function is performed in a fashion similar to that used to originally quiesce the portion of the device being serviced.

The foregoing and other objects, features, and advantages of the invention will be apparent from the following more particular description of preferred embodiments of the invention, as illustrated in the accompanying drawings.

DETAILED DESCRIPTION

Figure 1:
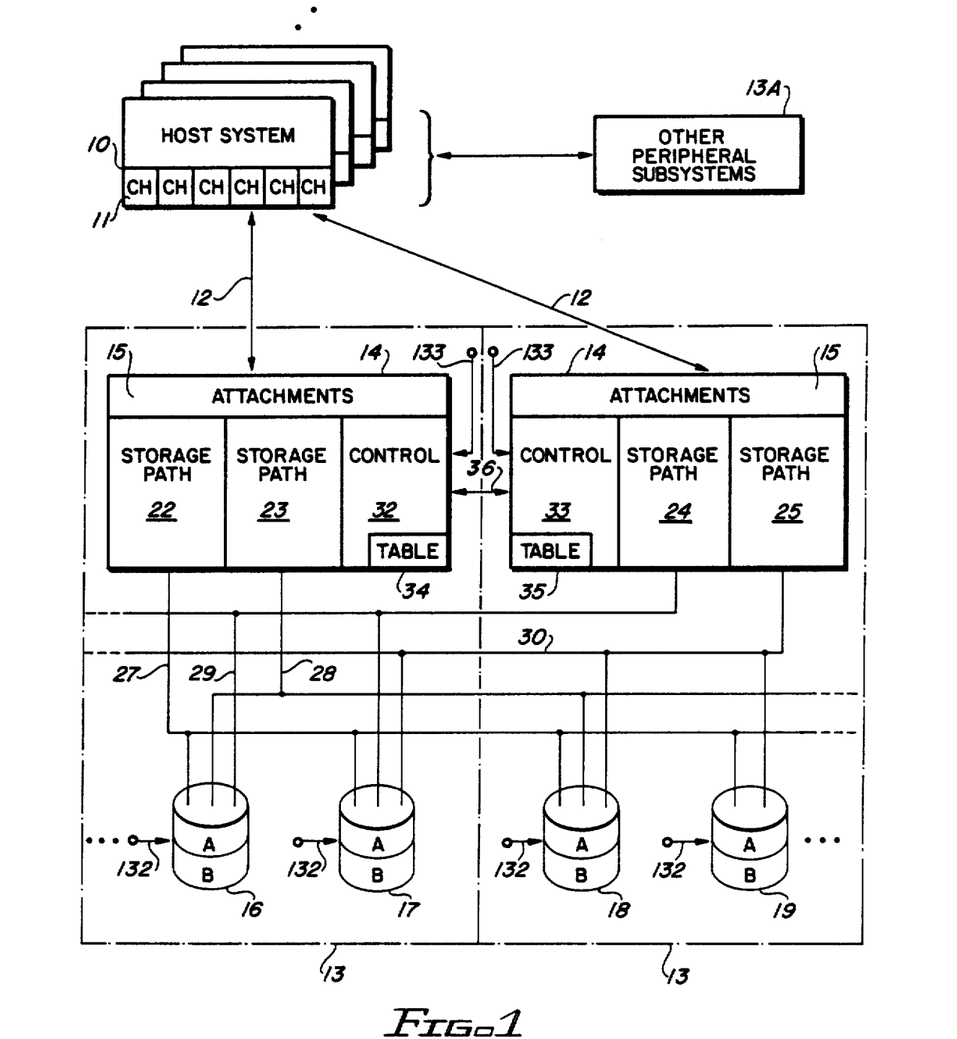
FIG. 1 is a schematic illustration of a system configuration which advantageously uses the present invention.

Referring now more particularly to the drawings, like numerals indicate like features of the invention shown in the various figures. The present invention is described in a multi-host system environment. A plurality of host systems 10 attach a plurality of peripheral data storage subsystems 13 hereafter referred to as subsystems 13. Additionally, host systems 10 attach a plurality of other peripheral subsystems 13A as is shown in FIG. 1. Each of the host systems 10 includes a plurality of channels CH 11, which respectively connect to the peripheral subsystems 13, 13A. Each of the host systems 10 may include one or more channel path connections 12 to each of the subsystems 13, 13A. Not all peripheral subsystems are attached to all of the host systems 10, while some of the subsystems are attached to a plurality of the host systems 10. For facilitating data communications between the respective host systems 10 and the various subsystems, particularly data storage subsystems, so-called channel path grouping is employed. Such channel path grouping is described in U.S. Pat. Nos. 4,207,609 and 4,396,984, incorporated by reference. In any channel path group, which may include several channel paths CH 11, the host system can request a peripheral action such as data storage from a given subsystem 13. Subsystem 13 may respond to the request over another channel path within the path group. Such dynamic pathing is controlled in part by the storage subsystems as explained in '609. The dynamic pathing may extend across a plurality of storage subsystems 13 as explained in '609 and as contemplated in the present description.

Each of the storage subsystems 13 includes a control unit, also referred to as a storage control 14. Each of the control units 14 includes a plurality of channel attachments 15 which are electrically and logically connected to the channel paths CH 11 of the respective host systems 10. The purpose of the control units 14 is to intercouple the host systems 10 on a selected basis to anyone of a plurality of data storage devices as shown in the drawing. A plurality of direct access storage devices (DASD) 16–19, are connected to the control units 14 for data communications with the various host systems 10. Each of the DASD 16–19 have two accessing mechanisms or head arms for accessing a plurality of data storing disk surfaces (not shown). Additionally, each peripheral DASD 16–19 includes two independently addressable disk files (disk recorders and players) with each of the disk files having two of the accessing mechanisms. This arrangement is found in the IBM 3380 data storage units and is represented by the alphabetic characters A and B in the symbol 16–19.

Each of the control units 14 can be constructed in a manner similar to that used for constructing the IBM 3880 type of control units. It is preferred that models 23 and 21 represent the hardware construction of the control units which are improved by practicing the present invention. Each of the control units 14 -includes two storage directors herein referred to as storage paths and an auxiliary control which serves as a support facility for the storage paths in their respective control units 14. For example, storage paths 22 and 23 are in a left-hand control unit 14 of FIG. 1 while storage paths 24 and 25 are in the right-hand control unit 14. Each storage path 22–25 includes a microprocessor and associated electronic circuits for transferring data signals between the DASDs 16–19 and the various host systems 10. Controls 32 and 33 in the respective control units 14 provide for general control of the control units 14 including maintenance procedures in the form of diagnostic circuits. A pair of tables 34, 35 in the respective control units 14 contain a joint array structure (JAS) as described in the co-pending, commonly assigned application and path group information corresponding to the dynamic pathing memory 25' of U.S. Pat. No. 4,207,609. Double-headed arrow 36 represents the electrical and logical interconnections between control units 14 for achieving the communications represented in U.S. Pat. No. 4,207,609 and as contemplated in the present description. All of the internal portions of the control units 14 including attachments 15, storage paths 22–25, controls 32, 33 and tables 34, 35 are all electrically and logically interconnected as is known and as is practiced in the IBM 3880 storage controls.

The electrical and logical connections between the control units 14 and the DASD 16–19 uses a so-called string connection when characterized by a string controller which is attached to the respective DASDs in the string. As an example, numerals 27–30 represent respective string connections between the control units 14 and the DASDs 16–19. Each of these connections includes a controller (not shown, such as the controller used with the IBM 3380 storage unit) for providing control and data transfers for the DASDs 16–19 by the control units 14. The illustrated interconnections of the control units 14 and the DASDs 16–19 shown in FIG. 1 is arbitrary; the significant thing is that several of the DASDs 16–19 are connected to the subsystems 13, i.e., there are cross-connections. The storage paths 22–23 are arranged in power clusters. Each cluster is independently powered. The clustering is arbitrary and based upon system needs. For example, storage paths 22 and 24 may be in one cluster while storage paths 23 and 25 can be in a second storage path cluster. Also, storage paths 22 and 23 may be in a single cluster while storage paths 24 and 25 can be in a single cluster. The present invention, as will become apparent, accommodates such power clustering in quiescing and resuming device operations in the subsystems 13. The control units 14 provide for dynamic path selection between DASD 16–19 and the various channel path groups. For example, a first dynamic path extends from one of the channels of host system 10 through a channel attachment 15 to storage path 23 thence to DASD 16. An alternate path for host system 10 is through a separate channel path CH 11 to an attachment 15 thence storage path 24 in a different power cluster and different control unit 14, thence over string 29 to DASD 16. The selection of such dynamic paths is under control thereof the subsystems 13. Of course the storage paths 23 and 24 can access any of the DASDs 16–19 which they are connected by the various string connections 27–30. Further, tables 34, 35 can be in separate power clusters along with the storage paths. Therefore a failure of one power cluster allows the subsystems 13 to operate from but one of the tables 34, 35.

In accordance with the invention, a command request initiated in a peripheral subsystem 13 is transmitted to the cognizant host systems 10 for quiescing portions of the subsystems for facilitating maintenance or other related procedures. Quiescing is making a resource such as a device as defined above to become not available to any of the host systems 10. In host processor vernacular, quiescing is equivalent to varying a device off-line. Upon completion of the maintenance procedure, a resume command/request is sent from the subsystem 13 to the cognizant host systems 10 indicating that normal operations with the quiesced device may be resumed.

Figure 2:
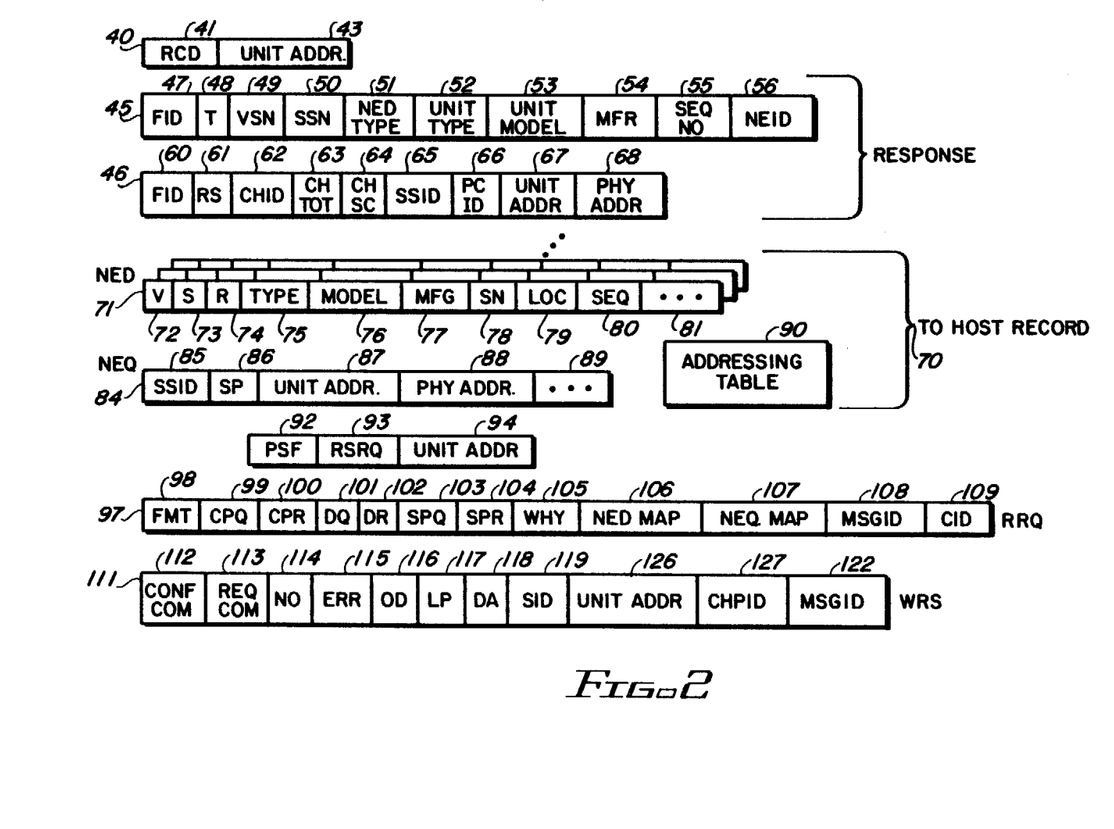
FIG. 2 is diagrammatic illustration of data structures used to illustrate the present invention.

The channel command and data structures in host systems 10 and subsystems 13 as detailed in FIG. 2 are next described. The channel commands are those commands supplied by a host system 10 through a channel path CH 11 to a subsystem 13 for performing a desired or requested operation. Generally such operations include data transfer commands, diagnostic commands, etc. U.S. Pat. No. 4,574,346 shows a plurality of channel commands which are incorporated into a single channel command called reconfiguration data (RCD) as used in the present description. In implementing the present invention, such RCD channel command is expanded to include the later described function. It is also to be understood that the tables of the various host systems 10 used for addressing, as is well known, are not shown in FIG. 2 for purposes of simplicity. Such addressing tables include addresses and access controls associated with channel path grouping as described above. In practicing the present invention in its best mode, each of the host systems 10 includes a subsystem internal configuration record which is obtained from the respective subsystems 13, 13A upon system initialization as described with respect to FIG. 3. A form of the RCD channel command is used for establishing this host system record. A command structure 40 includes a RCD field 41 which identifies the channel command as a RCD command. Each subsystem 13 responds to the RCD 40 command to supply internal configuration data indicated by numerals 45, 46 as node element descriptors and node element qualifier, respectively. The resultant host system 10 record generated by the subsystem 13 response 45, 46 is host record 70. Firstly, the response portion 45 for the node element descriptor (NED) is of a form resulting in a transmission of a plurality of descriptors for respective node elements or devices of the respective subsystems 13 13A.

NED 45 includes a plurality of fields headed by the identifier FID (format identification) 47 which identifies whether the following data is for a NED or for a node element qualifier (NEQ). FID 47 identifies message portion 45 as a NED. When FID 47 is equal to one, one of the DASD devices 16–19 is being described in the NED 45. When FID 47 is equal to two, the entire DASD 16–19 is being described, i.e., a storage facility. When FID 47 is equal to three, a storage path 22–25 is being described. Other values of FID 47 identify yet other node elements or devices which are selectively separable from the subsystem for maintenance purposes while allowing resume on field T 48 to continue. When FID 47 is equal to four, the NED is a token NED. This NED is used to uniquely identify a subsystem. This NED will be the same for all devices that attach to the same controller and all controllers that attach to the same device. Field T 48 when one, indicates that the NED is a token NED. This is a one when FID 47 is equal to four. Field VSN 49 indicates that the serial number for the device is a valid serial number, i.e., machine readable. For example, in each of the DASDs 16–19, the machine serial number may be recorded on one of the data bearing record surfaces, may be in an EPROM of the DASD, may be on a pin board or other form of mechanical indicators which are electrically sensible. The storage path serial numbers may be constituted in a similar manner or may be on a diskette (not shown) readable by the respective controls 32, 33 during system initialization and then stored in the tables 34, 35. It is apparent that various forms of machine readable serial numbers may be employed. Field SSN 50 indicates that the serial number included with the current NED 45 is a substitute serial number, i.e., is not one assigned to the device that is machine readable. SSN 50 is set to unity only when the device represented by NED 45 is not machine readable. Field NED-type 51 indicates the character and type of device represented by NED 45. When field 51 is equal to zero, the type is unspecified. In the present embodiment an unspecified-type device is a storage facility such as DASDs 16–19 taken as a group. When field 51 is equal to unity, then portions A or B of a DASD 16–19 related configuration is being defined. When field 51 is equal to two, a storage control type of control unit 14 is having its internal configuration being described. Other NED-type 51 values may also be used for further defining configuration of the subsystems 13. Field unit type 52 defines the manufacturer's type number assigned to the unit being defined. For example, for a storage facility, a type number is an IBM 3380, for a storage control a type number is 3880, etc. Field unit model 53 identifies the model number within the type. For example, for a 3880 type storage control, unit models may extend from model 1 through model 23, etc. depending upon the capability and internal configurations of such control units. The manufacturer (MFR) of the device is identified in field MFR 54. The manufacturing sequence number (SEQ NO) is included in field 55. The information for fields 52–54 is permanently stored in the respective units as vital product data and is, therefore, machine readable. Field NEID 56 is a node element identification. This field contains a number or other symbol to uniquely identify devices that have the same assigned or machine readable serial number. For example, portions A and B of DASD 16 share a common serial number for the storage facility DASD. In a similar manner, storage paths 22 and 23 share the same serial number of storage control or control unit 14. As an example, NEID 56 for storage path 22 may be zero while for storage path 23 may be unity.

Message portion NEQ 46 includes field FID 60 which identifies the message portion as an NEQ. Both FID 47 and FID 60 may respectively identify different types of NEDs and NEQs, respectively. Field RS 61 is a record selector for use with embodiments beyond a present description. Field CHID 62 identifies the channel paths CH 11 in accordance with a control unit address and position within attachments 15. For example, in the pair of subsystems 13, each of the control units 14 can include up to eight separate attachment circuits within attachments 15. Therefore, the pair of subsystems can include up to sixteen channel path attachments. CHID 62 then includes the address of the control unit or subsystem and a hexadecimal character indicating which of the channel adapters of attachment 15 is connected to the respective channel 11 of a host system 10. Single byte field CH TOT 63, when set to unity, disables a channel (CH) time out timer (TOT) within the channel adapter identified by CHID 62. In a similar manner, single byte field CH SC 64, when set to unity, disables the channel status checking for the device adapter identified in CHID 62. Field SSID 65 contains the identification number of the subsystem 13. Such SSID can be assigned by the data processing environment and is not a serial number or manufacturer assigned number. Field PC ID 66 is a two byte field for identifying a path or cluster as described above. Field unit ADDR 67 contains the unit address of a device being qualified by NEQ 46. The unit address is also termed a device address and is the coding or address used by a host system 10 to address the device when accessing a device through a channel 11. In contrast, field PHY ADDR 68 contains a physical (PHY) address of the device within a subsystem 13. Each of the control units 14 include a table matching the physical address to the unit address for accessing the respective devices. Therefore, it is seen that the response consisting of a plurality of NED's 45 along with an NEQ 46 gives to a host system 10 internal configurational data for enabling quiescing and resuming operations of devices within a subsystem 13.

Each of the host systems 10 apply the command 40 through all of the subsystems which incorporate the facilities of the present invention. Each of the host systems 10 generate a configurational table 70 (alternatively known as host record 70) for storage in the respective host systems. Each NED 45 results in a separate entry in the configurational table 70. The NED entries 71 of the host record table 70 include a validity bit V 72 for indicating that an NED record exists at the memory address of the internal memory (not shown) of the respective host system 10. Byte field S 73 when set to unity indicates that the device being described is a standard device as used in connection with the data processing environment. When equal to zero, a nonstandard device is indicated. Byte field R 74 when unity indicates a real device while a zero indicates a virtual device. In the present embodiment, all devices are real devices. Field type 75 indicates the type of unit. The information in this field is derived from NED-type 51. Field model 76 contains the unit type and unit model information from field 52 and 53. MFG field 77 contains the information of the manufacturer from field 54. SN field 78 contains the information from field 55. In the event a serial number and a separate manufacturing sequence number (two different numbers) are assigned, then field SEQ 80 contains the manufacturing sequence number while SN field 78 contains the assigned marketing or product serial number. It is assumed in this instance that the sequence number of field 55 is equivalent to a product serial number. LOC field 79 breaks out the manufacturing location information contained in field 54, i.e., field 54 indicates the manufacturer's name and the plant identification at which the unit was made. Elipsis 81 indicates other fields may be added to this host record.

NEQ record 84 includes SSID field 85 which stores the information contained in field 65. SP field 86 identifies the storage path associated with the NEDs 71 and is obtained from field 66. Fields 87 and 88 respectively contain the unit and physical addresses from field 67 and 68. Elipsis 89 indicates that additional fields in the record may be employed. Host systems 10 have sufficient configurational data in order to automatically quiesce (vary off) and resume (vary on) devices within a subsystem 13. A comparable data structure mechanism is provided for implementing the quiesce and resume functions. PSF command 92 is a host system 10 command supplied to a subsystem 13 in response to a later described attention signal to request information concerning a quiesce or resume. Field 93 is a command modifier RSRQ which is resubsystem, reconfiguration request which is addressed to a unit address indicated in field 94. The commanded subsystem 13 responds to the PSF command 92 to send an RRQ (read reconfiguration for quiesce) information indicated by numeral 97. FMT field 98 indicates the format of the RRQ, i.e., whether it corresponds to an NED type 0, 1 or 2 as explained above with respect to NED 71 and NED information 45. Field 98 is used to address which of the records 71 corresponds to the RRQ 97. Field CPQ 99 is a byte when set to unity indicates that the RRQ relates to a channel path quiesce. Correspondingly, CPR field 100 corresponds to a channel path resume request. DQ 101 corresponds to a device quiesce, i.e., a portion A or B of a storage facility or DASD 16–19 as being quiesced. Correspondingly, DR field 102 is a device resume request. SPQ 103 is a so-called inform storage path quiesce. This field indicates that a storage path will be quiesced, but that an alternate storage path in the same power cluster is available for accessing devices accessible through the storage path being quiesced. Similarly, field SPR 104 is an informed storage path resume. Optional field WHY 105 indicates the reason for the RRQ 97 such as inoperative device, degraded device, routine maintenance, etc. Fields 106 and 107 are respectively NED and NEQ byte maps for identifying which of the NEDs and NEQs stored in host record 70 need be accessed. MSGID 108 is a field containing a message identification assigned to the RRQ as later described. CID field 109 gives the channel attachment of attachments 15 identification as described above for CHID 62.

Figure 4:
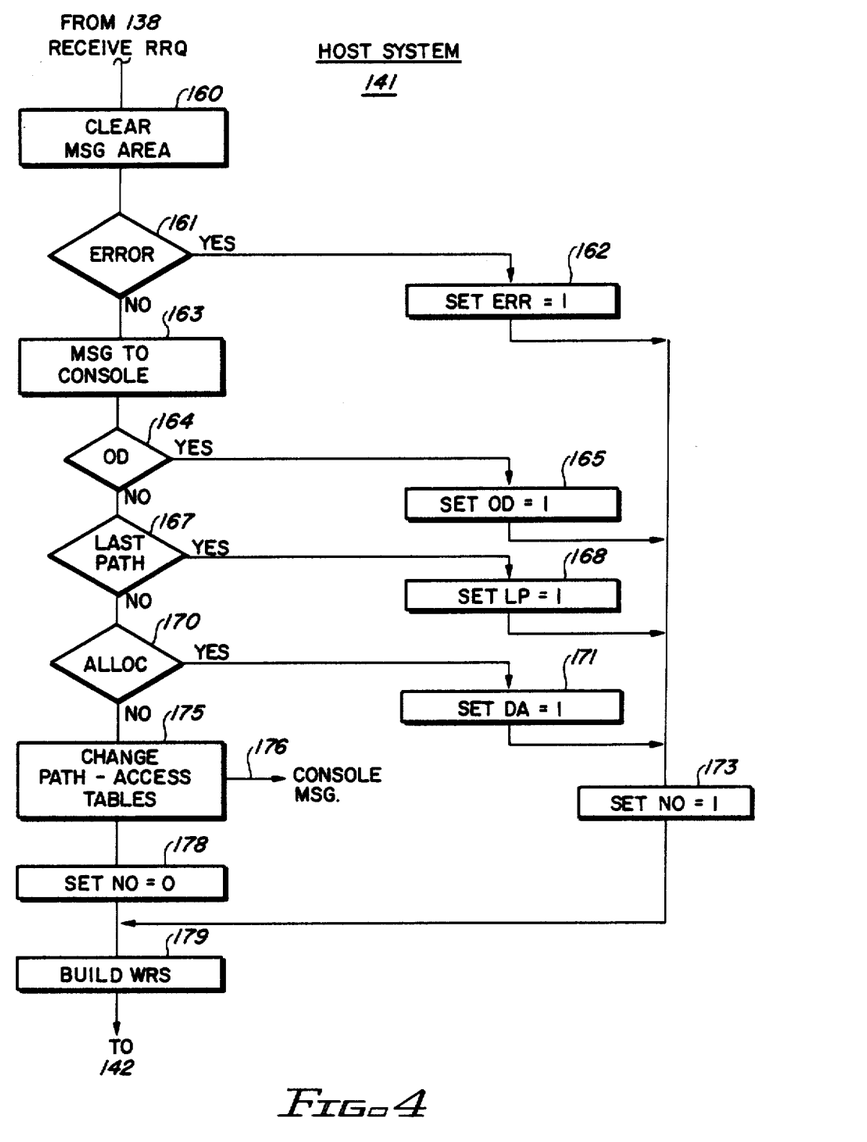

The host systems 10 receiving RRQ 97 form the machine operations described in FIG. 4. Upon completion of those operations, a response is sent by each of the host systems 10 to the requesting subsystems 13 in a message WRS 111 (write configuration status) which indicates whether or not the requested reconfiguration has been effected in the host record 70 as well as other addressing tables (not shown) as are used by host system 10, or if the reconfiguration failed or is not permitted as will become apparent. Field CONF COM 112 is a byte field, when set to unity, indicates that the requested configuration change has been completed. Field REQ COM 113 indicates that the request, such as a resume request, has been completed. NO field 114 indicates that the host system 10 is not honoring the requests and the quiesce resume is not supported by that host system. This means that the quiescing cannot proceed without further activity beyond the scope of the present description. Fields 115 through 118 indicate the reason for the no-byte 114 being sent. ERR field 115 indicates that a host detected an error either in the format or in the information contained in the received RRQ 97. Based upon that error, the host cannot proceed with the reconfiguration. OD field 116 indicates that the machine or data processing system operator has denied the request, then maintenance personnel will have to confer with the operator which is beyond the present description. LP field 117 indicates reconfiguration is denied because the reconfiguration would remove the last accessed path to portions of the subsystem, again activity beyond the scope of the present description is called for based upon this denial of reconfiguration. DA field 118 indicates that the reconfiguration cannot proceed because the device identified in the RRQ 97 is currently in an allocated state, i.e., being used by the host system 10 responding or another host system 10. SID field 119 contains the host system 10 identification assigned to it in the data processing environment. This is a user assigned number and not a manufacturer's assigned number. This system identification is used by personnel for identifying which host system 10 caused the reconfiguration to fail. Field 126 contains the unit address corresponding to the unit address in PSF command 92. CHPID field 127 identifies the channel path that received the attention RRQ 97. The CHPID is a channel path identification corresponding to identification CHID 62. MSGID field 122 contains the contents of MSGID field 108 such that the controller can relate the WRS 111 to the RRQ 97.

Figure 3:
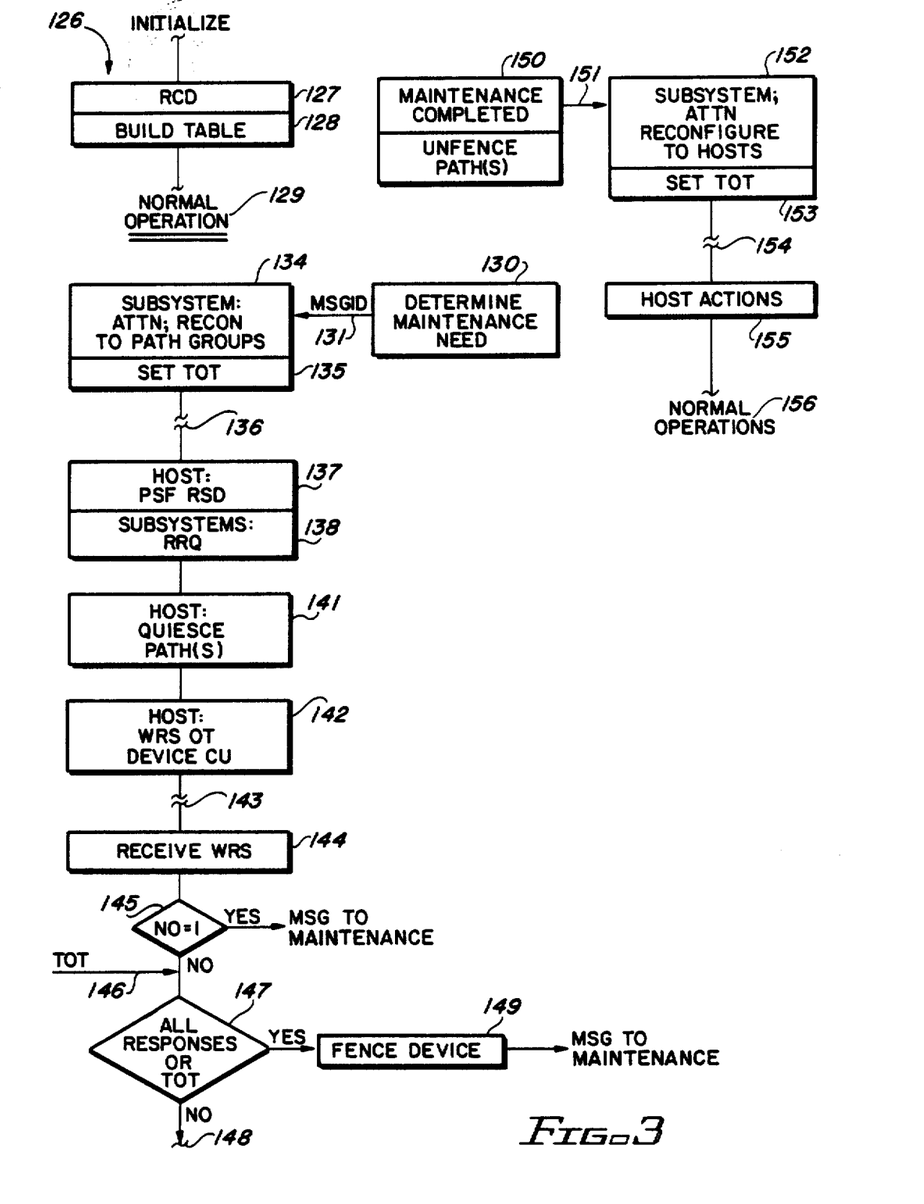
FIGS. 3 and 4 are machine operations charts showing one implementation of the present invention.

FIG. 3 illustrates the machine operations in both the subsystem 13 and the host system 10 along with maintenance actions closely associated therewith for implementing the present invention in the FIG. 1 illustrated data processing system employing the data structures of FIG. 2. The first actions occur during data processing system initialization. It is assumed that the various subsystems 13 have completed their respective initializations including microprogram loading. It is also assumed that host systems 10 initialization has been respectively completed by querying the various subsystems 13 and 13A for establishing control data tables in the respective host systems 10. A single host system 10 command is incorporated at 126 in the host system initialization processing. The reconfiguration data command RCD is issued at step 127 to each of the subsystems for obtaining the NED and NEQ responses 45, 46. The respective subsystems 13 complete their response enabling each requesting host system 10 to build the host record or table 70 at step 128. Upon completion of initialization, normal data processing operations ensue at 129.

During day-to-day operations of a data processing system, maintenance and other operating personnel observe the operations of devices in subsystem 13. If a maintenance need is determined as at step 130, then a message is sent into subsystem 13 as indicated by arrow 131. Controls 32, 33 are programmed to respond to the commands and have connections to the various portions of the subsystem 13 for acquiring status information and for performing maintenance related functions. Additionally, controls 32, 33 communicate with host system 10 through the storage paths 22–25 for sending the response 45, 46 to the RCD command 40, sending the RRQ request and receiving the WRS host response. Each RRQ 97 request has a unique MSGID which is returned in the WRS 111. This allows the control unit to determine which hosts have responded to the RRQ 97. The control unit can be a single or multi-path control unit. The maintenance person will either:

(A) want to take down a cluster for control unit maintenance.
  On single path control unit, the control unit must be quiesced for both SPs.
  On multi-path control unit, the control unit must be quiesced.
(B) want to take down a path for director device connection (DDC) or control unit maintenance.
  On single path control unit, quiesce the control unit for the path needed.
  On multi-path control unit, quiesce the control unit. This is because other SP in cluster can pick up all the work without the host being aware that the resource was lost.
(C) want to repair the device, quiesce the device.

Such commands include a request to quiesce a control unit, resume a control unit, quiesce a storage path and resume a storage path, quiesce a device and resume a device, request status (the controls 32, 33 then display the status corresponding to the received WRS 111 to a supplied MSGID122), cancel a request (RRQ97 is cancelled) as well as other commands not related to the present invention. When a quiesce request is cancelled, controls 32, 33 cause a corresponding storage path 22–25 to send an RRQ 97 reestablishing or resuming normal operations. Such command insertion locations are diagrammatically illustrated in FIG. 1 by the arrows 132 for the DASD 16-19 and arrows 133 for controls 32, 33. Such insertion points may be a separate console or control panel as usually found on peripheral equipments, may also merely constitute a receptacle into which a cable connected to a diagnostic computer is inserted. Other forms of command inputs are readily available and can be easily envisioned.

Controls 32, 33 respond to a receive command as indicated at step 134 by activating a corresponding storage path 22-23 to send an attention signal (presentation of status information can be obtained from the IBM OEMI manual) indicating a message from the control unit is waiting to be read. One attention signal is supplied over a channel path in each of the channel path groups as set forth in '609 and any channel path that is not a member of a multiple channel path group. A time out timer (TOT, not shown) of controls 32, 33 is set at step 135. Typically, time out is measured in minutes. If not all of the host systems 10 respond when the timer times out, then a message is given to the maintenance personnel indicating that fact. Maintenance personnel then can cause the device to be isolated for maintenance purposes. Upon completion of steps 134 and 135, normal operations ensue as indicated by numeral 136 awaiting the responses from each of the host systems 10 channel path group. This means a given host system 10 which has for example two channel path groups, will send two responses to the requesting subsystem 13, one for each of the channel path groups. If all eight channels of a host system 10 are individually operating, i.e., not a member of a channel path group, then the host system 10 responds with eight WRS 111 responses.

The host system 10 action to each received RRQ 97 is illustrated in steps 137 through 142. At step 137, the receiving host system recognizes the attention signal with the request for reconfiguration. It then supplies to the requesting subsystem 13 for each received attention signal the PSF command 92 which indicates to subsystem 13 to send a message. The subsystem responds at step 138 to send the message, which is a RRQ 97, over the indicated channel path. The message type indicates that it is a RRQ 97. Note that the PSF 92 command can come over one channel path of a channel path group while the RRQ 97 returns over another channel path to the host processor within that same channel path group. At step 141, the host responds to the RRQ to attempt to quiesce the paths or devices as further explained later in FIG. 4. Upon completion of step 141, the responding host system 10 sends WRS 111 at step 142 to the subsystem 13. The travel path of WRS 111 is first to the storage path 22-25, then to controls 32, 33 which then update the JAS in tables 34, 35. All of the above described actions are represented in FIG. 3 by numeral 144. Numeral 143 indicates that various actions within both the host system 10 and the subsystem 13 may occur during these times. At decision step 145, control 32 or 33 determine whether or not NO field 114 of WRS 111 is equal to unity. If it is equal to unity, the attempted reconfiguration is refused or has failed with a suitable message being supplied to a maintenance panel readable by the maintenance personnel. Such messages will include the SID 119, unit ADR 126 and CHPID 127 of WRS 111 as well as other pertinent information. If the NO field 114 is zero, then at step 147 the control 32 or 33 determine whether or not all of the responses from the several RRQ 97 sent to host systems 10 have been received or if all the responses have not yet been received reconfiguration cannot proceed. Therefore, normal operations are returned to as indicated at end point 148. If all the responses have been received, then at step 149 control 32 or 33 "fences" the device to be isolated. This is both a logical and electrical fence for enabling maintenance personnel to access the identified device for maintenance exercising or repair. Upon fencing the device, a message (MSG) is also sent to the maintenance panel along with the other pertinent information of WRS 111 for reading by the maintenance personnel so that maintenance can quickly proceed.

Upon completion of the maintenance as indicated at numeral 150, maintenance personnel supply a resume command as indicated by arrows 132, 133 for enabling the resume of operations. When the resume command goes to a DASD 16-19, the DASD supplies the resume command over one of its string connections 27-30 to control 32. Control 32 or 33 responds to the resume command to unfence the fenced device. Upon completion of the unfencing, control 32 or 33 activates a storage path 22-25 as indicated by arrow 151 to supply an attention signal with the reconfigure modifier to all of the host systems 10 that received the previous RRQ 97 at step 134. Again, there is one RRQ 97 sent to each access channel or channel path group. If some of the channels or channel path groups became inoperative in step 134, then those channels or channel path groups will not receive the RRQ 97. If on the other hand some of the channel path or channel path groups became active since step 134, then the RRQ 97 sent at step 152 will go to those channels and channel path groups as well. In step 152, the phrase "to hosts" indicate a plurality of messages as above stated. A time out timer is set at step 153. Other operations ensue as indicated by numeral 154. The host systems 10 respond as above described for the quiesce request. Such host actions are represented at step 155 and correspond to the steps 137-142 except that reconfiguration is for resuming or setting up access to the previously quiesced device. Upon completion of the reconfiguration, control 32 or 33 will send a message to the maintenance personnel as indicated at step 149 indicating that a device resume has been completed. When a time out timer expires either for a quiesce or resume, the time out timer activates control 32 or 33 for completing the subsystem 13 machine operations as if all the responses had been received. For a quiesce request, the time out timer wake up signal supplied is indicated by arrow 146 causing control 32 or 33 to execute step 147 and then step 149 even though all of the responses have not yet been received.

FIG. 4 illustrates the host system action in response to each RRQ 97. The RRQ 97 is received from step 138 of FIG. 3. The host system 10 clears a message area at step 160 for building WRS 111. First host system 10 checks to see if an error has occurred in RRQ 97. If at step 161 such an error occurs, then at step 162, host system 10 accesses the just cleared message area (not shown but resides in main memory of the host system) 160 for setting ERR field 115 to unity. The host system then proceeds to step 173 for setting NO field 114 to unity. Then the WRS 111 is built at step 179 and sent to the subsystem 13 at step 142. When the quiescing host system 10 finds no error in RRQ 97 at step 161, it then sends a message to the console at step 163 for the benefit of the data processing system operator. The operator in most instances controls whether or not a reconfiguration is permitted. The console operator will respond to the quiescing host system 10 using a console message which is received by the program causing the quiescing which program is in the operating system of the host system. If the console message indicates that the operator has denied the requested reconfiguration, the host system 10 proceeds from step 164 to step 165 for setting OD field 116 of WRS 111 to unity. It then proceeds to the previously described steps 173, 179. If the operator does not object to reconfiguration, then the host system 10 proceeds from step 164 to step 167 to examine its configuration tables such as tables 70 and other addressing tables used in the host system 10 such as in connection with practicing the invention for patent '609. If a last path to portions of the subsystem 13 is removed, then reconfiguration should not proceed. Accordingly, host system 10 at step 168 sets LP field 117 of WRS 111 to unity, then proceeds to steps 173, 179. If the reconfiguration does not result in removal of a last access path at step 167, host system 10 at step 170 determines whether or not the device is allocated access to one of the DASD 16-19. Such device can be allocated whether it be a storage path 22-25, etc. If an allocation is not effected (note that the dynamic pathing may avoid an adverse effect on an allocation of DASDs 16-19 by removal of a storage path 22-25 from the accessed paths), then host system 10 proceeds to step 175 for changing its path access table. Upon completion of those changes, a console message is sent to the operator as indicated by arrow 176. If on the other hand an allocation is impacted, then at step 171 host system 10 sets DA field 118 of WRS 111 to unity, then proceeds to step 173, 179. Upon its successful completion of a reconfiguration by changing the path access tables within the host system 10 which impact the unit address indicated in field 87 of the host record 70, host system 10 sets NO field 114 to zero, then proceeds to building WRS at step 179. Note that the unit address of WRS 111 corresponds to the unit address in field 87 of the host record 70 accessed during the reconfiguration.

From the above it can be seen that reconfiguration is automatically performed by commands entered into the peripheral subsystem 13 with all of the connected host systems 10 updating their table for effecting the logical reconfiguration without negatively impacting the data processing system data integrity. It should be noted that there is one host record 70 for each unit address 87 in each of the subsystems 13 which employ apparatus for implementing the present invention. Such records occur in each of the host systems 10 connected to the subsystem 13.

The need for maintenance of the controllers sometimes requires their being powered down. One way of powering down a controller without significantly disrupting the operation of the subsystem is to reconfigure the system to quiesce the storage paths connected thereto. After quiescing the storage paths, as previously described, the controller can be powered down, maintained, and returned to operation. By quiescing the storage paths connected to the controller to be maintained, polling of that controller ceases, thereby avoiding the occurrence of error messages when the controller is powered down. This method works well in a subsystem in which all of the string connections between the control units and the data storage unit strings are multiple string connections. However, if there exists but a single string connection between a control unit and a first data storage unit string, and the string connection is also connected to one or more other data storage unit strings, problems arise. For example, if the storage path to which such a single string connection is connected is quiesced, all access to the first data storage unit string via the particular control unit is cut off.

The aforementioned problems associated with quiescing a storage path for maintenance of a controller can be avoided by instead quiescing the controller itself. This is accomplished by identifying the controller from the NED information relating to the storage paths and the data storage units. If the controller to be maintained is connected to the control units via single string connections, the host systems are instructed to quiesce the channel paths to the controllers. This is accomplished using the host systems' configuration tables. If, however, the controller to be maintained is connected to the control units via multiple string connections, an indication of the controller quiescence must also be stored in the host system and control unit configuration tables or any other accessible storage facility provided. During quiescence, the indication that the controller is being maintained is used to avoid the generation of error messages during polling operations. By quiescing the controller instead of the storage paths connected thereto, the accessibility of the data storage units to the control units is not affected.

Automatic reconfiguration of the system is also useful for non-disruptively installing and eliminating a data storage unit string from a subsystem. To non-disruptively install a data storage unit string, the storage paths are quiesced in succession during which time the required connections between the storage paths and the string are made. As each storage path returns on-line after its quiescence, it checks for connections between the controllers connected to it and other storage paths and inputs the information to the control unit tables. Thus, after each of the storage paths has been quiesced and returned to operation, the system reconfiguration is functionally complete.

To non-disruptively eliminate a data storage unit string from a subsystem is slightly more complicated. Simply quiescing the storage paths in succession (as for nondisruptive installation) while the string is disconnected will not work. When the first storage path to be quiesced is subsequently returned to operation, it will check for connections between the controllers and other storage paths. Since the other storage paths will not yet have been quiesced, the first storage path will determine that such other storage paths are connected to controllers which it no longer is aware of and will generate error messages. This problem is solved by creating a new command which inhibits the controller connection determination made as each quiesced storage path is returned on-line. The command will also reset the indication of the controller's existence in the control unit tables. Thus, no errors are generated upon string elimination because the control unit does not remember that it was told to remove a string, or that the string ever existed.

While the invention has been particularly shown and described with reference to preferred embodiments thereof, it will be understood by those skilled in the art that various changes in form and details may be made therein without departing from the spirit and scope of the invention.

What is claimed is:

1. In an improved data processing system having a host system with attached peripheral subsystems, at least one of said subsystems including a plurality of addressable devices, said devices maintained by a maintenance person;
   the improvement including, in combination:
   each of said devices having a command input portion for receiving manually entered input commands independently of said host system;
   reconfigure request means in said one subsystem being operatively coupled to said input portions for receiving at least one of said input commands and being responsive to a one of said received input commands, said input commands indicating that a given one of said devices is to be maintained in an off-line condition by said maintenance person, and for generating a quiesce request;
   communication means in said reconfigure request means for sending to said host system said quiesce request indicating a desired removal of said given device from those devices accessible by said host system;
   configuration control means in the host system having a configuration table and begin operatively coupled to said communication means for receiving said quiesce request and being responsive to said quiesce request for determining whether or not to allow such quiesce request and modifying said configuration table accordingly, thereby making the reconfiguration in the host system, when allowable, and recording same in said host system configuration table so that access to said given one of said devices may be suspended;
   response means in the configuration control means for generating a write system status command and for supplying same to the communication means indicating host system approval or denial of the quiesce request; and
   said reconfiguration request means and said communication means also responding to a second one of said received input commands for reestablishing access to said given device and to request said host system to reconfigure by modifying said configuration table accordingly.

2. In the data processing system set forth in claim 1, further including, in combination:
   a plurality of channel paths extending between the host system and the peripheral subsystem, including groups of predetermined ones of said channel paths; and
   said communication means including means for sending a request over each of said channel paths between the host system and said device to be quiesced, excepting that in said channel paths belonging to a group of channel paths said request is sent over any one of said channel paths within the group of channel paths.

3. In the data processing system set forth in claim 2, further including, in combination:
   said one peripheral subsystem including a plurality of programmed control units and a larger plurality of peripheral units, each of said control units being independently operable for making the quiesce request and including the reconfiguration request means and communication means therein;
   each of the control units including devices within an access path of the peripheral subsystem which are path devices and each of the peripheral units including at least one device which is a peripheral device with interconnections between said control units and said peripheral units such that each peripheral unit can be accessed by any one of a plurality of path devices in either of said control units;
   each of said control units having a configuration map for each of said peripheral devices which includes identification of all internal access paths of the subsystem including identification of the path devices and further including a configuration map for each of the path devices which are accessible via the channel paths; and
   said communication means sensing said maps for determining which of the channel paths and channel path groups to send said request over to said host system.

4. In the data processing system set forth in claim 3, further including, in combination:
   means in each of said control units having access to said configuration maps and operative when the system is initialized to supPly a coPy of all of said configuration maps to said host system; and
   said configuration control means in the host system receiving said configuration maps and storing same and accessing same for examining the configuration maps to determine the effect of a quiesce request and changing the maps whenever such a request is approved.

5. In the data processing system set forth in claim 4, further including, in combination:
   an operator console connected to the host system for providing communication between an operator and a host system; and
   said reconfiguration control means in the host system being coupled to said console for supplying a message to the console for obtaining approval of the operator for a quiesce request before approving such request.

6. In the data processing system set forth in claim 4, further including, in combination:
   said configuration control means having analysis means for examining said stored configuration maps to ascertain whether the quiesce request would remove the last access path to any of said devices and approving said request only if at least one access path remain for any of the devices in said subsystem.

7. In the data processing system set forth in claim 4, further including, in combination:
   said configuration control means in the host system having error control means for analyzing each of said received quiesce requests for detecting errors in said request, and if an error is detected in any one of said received requests not approving such one received request.

8. In the data processing system set forth in claim 4, wherein said host system includes an operator console and the host system has a plurality of addressing tables;
   query means in said response means of said configuration control means, said query means for sending inquiries to said console for obtaining host operator permission, for examining a received quiesce request for detecting error, for determining the last path of access to a device affected by said request and for sending a denial indication to the response means whenever any of the queries indicate no operator permission, a last path exists or an error exists; and
   said response means sending said denial information as a part of said write system status command.

9. In the data processing system set forth in claim 8, further including, in combination:

identification means in said response means for adding to said write system status command information identifying the access path and the host system which gave the denial indication.

10. In the data processing system set forth in claim 3, further including, in combination:

each of said control units including a single command input portion acting as the common command input portions for all of said path devices within such control unit;

each of said common command input portions including programmed means constituting said reconfigure request means and said communication means; and said plurality of peripheral units attached to said control units for communication therewith and each of said peripheral units including at least one of said peripheral devices and having a peripheral common command input portion for all of the devices within the respective peripheral unit as constituting the command input portions of the respective devices and including means for supplying quiesce requests received from the respective peripheral common command input portions to said communication means for relaying to the host system via one of the path devices in a one of the said access paths to the device being reconfigured from said host system.

11. In the data processing system as set forth in claim 1, wherein instead of said devices having a command input portion, the command input portion can come from a single host console to allow the control unit to coordinate removal of a resource from all attached host systems.

12. In a method for selectively quiescing a device of a peripheral subsystem having a manual input portion for receiving commands independently of an attached host system of a data processing system, and wherein said peripheral subsystem has a plurality of such devices;

the steps of:

generating in the peripheral subsystem a subsystem configuration table indicating all subsystem internal access paths to said devices for enabling access by the host system to said devices;

supplying said subsystem configuration table to said host system and storing the subsystem configuration table in said host system;

manually inserting into the peripheral subsystem a request to quiesce a one of said devices for temporarily preventing access to the one device by said host system;

in said peripheral subsystem, generating a plurality of reconfiguration requests relating to each possible access path between the host system and said one device and sending all of the reconfiguration requests over the respective possible access paths to said host system;

in said host system, receiving and analyzing all of the received reconfiguration requests for determining permissibility of the requested quiescence, if said analyzing indicates permitted quiescence, indicating such quiescence in all tables of the host system for the respective access paths and supplying an indication to the peripheral subsystem that the data processing system has been reconfigured enabling said quiescence;

if said analyzing indicates quiescence is not permissible, then sending a message to the subsystem that the quiescence is denied along with a reason for said denial; and in said subsystem, responding to all of said quiescence indications to isolate said device and indicating to said manual input portion that reconfiguration has been completed for preventing access to the device by said host system, and responding to any one of the quiescence denials indicating to said manual input portion that reconfiguration has been denied.

13. In the method set forth in claim 12, wherein a plurality of access paths extend between the attached host system and the peripheral subsystem including a plurality of access paths within the peripheral subsystem such that the host system can through dynamic pathing access any of the devices through one or more of said access paths;

further including the steps of:

grouping the access paths into path groups such that a host request or command signal sent to the subsystem can be responded to over any of the accessed paths within a path group; and sending one reconfiguration request to the host system for each path group over one of the access paths in each respective path group, and sending a single request for each of said access paths which is not a member of any path group over each of the respective access paths.

14. In the method set forth in claim 12, wherein said peripheral subsystem has unit devices at the end of each of the access paths with the unit devices being addressable by the host system and a plurality of path devices in the respective access paths;

the step of:

varying off any of said path devices unless a vary off of a path device removes a last path of access to a one of said unit devices.

15. In the method set forth in claim 12, further including the step of:

in said host system, generating a denial message for transmittal to said peripheral subsystem and including in said denial message an identification of the access path over which a reconfiguration request was received from the peripheral subsystem and identification of the attached host system generating the denial with a reason, therefore, said reason being selected from the group of operator denial, last path is erased or an error exists in the configuration request.

16. In the method set forth in claim 12, wherein the steps further include:

including in said reconfiguration request a request to resume operation of a quiesced device.

17. In a method of operating a data processing system with an attached peripheral subsystem, one of the peripheral subsystems including a plurality of addressable devices, each of the devices being capable of being varied off line such that host system access to the respective devices is prevented;

the improvement including the steps of:

electrically indicating a need for an off line maintenance function to be performed on a given one of said devices;

in said peripheral subsystem, generating for said given one device, a vary off request and sending the request to said host system;

in said host system, receiving said vary off request and determining whether or not the received vary off request can be effected for automatically varying the one device by the host system, if the requested vary off can be automatically established, varying the given device off line and sending a message to the given device that it is varied off line, else indicating to the peripheral subsystem that the given one device cannot be automatically varied off;

when said given device is automatically varied off, fencing the device from other devices by the peripheral subsystem for performing said off line maintenance;

upon completion of the off line maintenance, removing the fencing by the peripheral subsystem and electrically indicating that the given one device is to be varied on;

in said peripheral subsystem for said given one device, sending a request to the host system to vary the given one device on for enabling host system access thereto; and in said host system, reconfiguring the data processing system to vary said given device on for enabling host system access thereto.

18. In the method set forth in claim 17, wherein a plurality of access paths extend between the host system and the various devices within the peripheral subsystem further including the step of:

sending said vary off requests over each of said plural access paths.

19. In the method set forth in claim 18, further including the steps of:

grouping some of said access paths into logical groups; and sending said vary off requests over but one of the access paths in each of said access path groups.

20. In the method set forth in claim 19, further including in said host system as a part of said determining step, sending said vary off requests to a console of said host system for obtaining concurrence of a human operator for the reconfiguration of the data processing system in accordance with said vary off requests and performing said reconfiguration only when the operator console indicates the operator approval, otherwise denying the vary off request and sending a denial response to the peripheral subsystem.

21. In the method set forth in claim 19, further including in said determining step examining the data processing system configuration for determining whether or not the vary off of the given one device will remove a last access path to another of said devices of said peripheral subsystem, if a last path is removed denying the vary off request and indicating a reason for the denial to said peripheral subsystem, otherwise reconfiguring the data processing system by varying off the given one device.

22. In the method set forth in claim 19, further including in said determining step examining the received vary off request for errors;

if an error is detected in the vary off request, denying the vary off request and sending a denial command to said peripheral subsystem with indication that the vary off request was an error, otherwise reconfiguring the data processing system by varying off a given one device.

23. In the method set forth in claim 18, further including in said determining step sending a concurrence request to an operator console of said host system, checking the data processing configuration for determining whether or not the vary off of the given one device will remove a last access path to another device and checking the vary off request for errors;

if no concurrence is received from said console or if a last path is removed or an error is detected in the vary off request, not performing said reconfiguration and sending a denial message to the peripheral subsystem indicating reconfiguration cannot proceed and including in said denial message an identification of the access path over which said vary off request was received and identification of the host system giving the denial; and otherwise reconfiguring the data processing system.

24. In the method set forth in claim 18, further including in said peripheral subsystem path devices in said access paths interposed between the host systems and said predetermined ones of the devices; and in said determining step, whenever said given one device is a one of said path devices, checking the data processing system configuration including the access paths internal to the peripheral subsystem for determining whether or not the vary off of a path device removes a last access path from any of said predetermined ones of said devices and denying the vary off request if such last path would be removed by varying off such path device.

25. In a method for selectively quiescing a device of a peripheral subsystem having an independent command input portion such that access to said quiesced device by connected host systems is prevented; the steps of:

in said peripheral subsystem, generating a configuration table of the access paths internal to the peripheral subsystem which enable access to each of the devices by the connected host systems;

sending said generated configuration table to all of said host systems;

storing the sent configuration table in said host system;

independently of the host system, manually inserting via said command input portion into said peripheral subsystem a command to quiesce a one of said devices;

in said peripheral subsystem, identifying said access paths for said one device and sending a reconfiguration request to said connected host systems relating to said identified access paths for reconfiguring the host system accesses to said peripheral subsystem to omit said one device from such accesses;

in said connected host systems, receiving and analyzing said received reconfiguration request and reconfiguring the data processing system to prevent access to said one device and sending a message to the peripheral subsystem that the data processing system has been reconfigured in accordance with the request and modifying the stored configuration table to show the prevented access.

26. In the method set forth in claim 25, further including the steps of:

sending an independent command to resume operation of a quiesced device;

in said peripheral subsystem, generating a configuration request indicating resumption of operation of said quiesced device and sending the resume configuration request to all of said host systems and in said connected host systems receiving and analyzing the received reconfiguration request and reconfiguring the data processing system for enabling access to said one quiesced device and sending a message to the peripheral subsystem that the data processing system has been reconfigured in accordance with the resume request and modifying the configuration table in the host system to show the enabled access.

27. In the method set forth in claim 25, wherein a plurality of access paths extend from said host systems to said devices of said peripheral subsystem, unit ones of the devices being disposed at the ends of one or more of said plural access paths, other ones of said devices being disposed in said access paths interposed between the host system and said unit ones of the devices;
in said generating step, generating a path configuration map for each of said unit one devices and sending all of said configuration maps to said host systems as said configuration table.

28. In the method set forth in claim 27, sending a one of said reconfiguration request to said host system for each of said path configuration maps relating to said one device to all of said host systems.

29. In the method set forth in claim 28, including sending each of said reconfiguration requests over a one of said access paths identified in the respective configuration maps and if more than one of said access paths is identified in such configuration map, sending said reconfiguration request over a one of said access path identified in such configuration map.

30. In the method set forth in claim 28, further including, in each of said host systems analyzing and responding to the received reconfiguration requests independently of all other received reconfiguration requests.

31. In a peripheral subsystem having host system attachment means and a plurality of devices which are selectively separable from being accessed by said attachment means, a plurality of access paths each including a portion of said attachment means for accessing respective ones of said devices, each device being accessible by the attachment means via one or more of the access paths;
the improvement including, in combination:
configuration means coupled to the attachment means and having a configuration map of the subsystem access paths for each of said devices and for sending said configuration map to the attachment means for transmittal to one or more attached host systems;
control means having reconfiguration request means coupled to said attachment means for supplying request signals to said attachment means requesting internal configuration of said subsystem; and
said control means having reconfiguration control means coupled to said attachment means for receiving reconfiguration approval signals form the attachment means and for reconfiguring the access paths internal to the subsystem which includes quiescing any device only when a received reconfiguration approval is received from said attachment means.

32. In the peripheral subsystem set forth in claim 31, wherein:
unit ones of the devices being operatively connected to said access path at one end thereof wherein a plurality of said access paths may terminate at one of said unit ones of the devices and further may extend to a plurality of said unit ones of the devices wherein each unit one device operative connection to such a one access path is independent of connection of other of said unit ones of the devices to such access path;
others of said devices being path devices in the peripheral subsystem and being logically and electrically interposed in said access path between said attachment means and said plurality of unit ones of the devices; and
said reconfiguration request means supplying a request signal to said attachment means for each of said access paths which the device to be quiesced has an operative connection and sending such request over the respective operatively connected access path for said device to be quiesced.

33. In the peripheral subsystem set forth in claim 32, wherein said control means has a plurality of operative connections to said path devices and supplies said request signals to said attachment means via a respective one of said path devices which path device is operatively connected to an access path operatively coupled to said device to be quiesced.

34. In the subsystem set forth in claim 33, wherein said attachment means includes means grouping said access paths into logical groups; and
said reconfiguration request means having means limiting the number of request signals to one of the access paths in each of said group said access paths.

35. In a method for operating and controlling access paths of a peripheral subsystem, wherein the peripheral subsystem has host system attachment means coupled to a host system, a command input portion, and a plurality of addressable devices which are selectively separable from being accessed by said attachment means with a plurality of said access paths extending between the attachment means and said plurality of devices, with each of said devices being accessible by said attachment means via one or more of said access paths;
the steps of:
generating a configuration table in the host system consisting of a plurality of path access tables of said access paths, said path access tables operatively coupled to said access paths respectively;
manually inputting a command into the command input portion of the peripheral subsystem for reconfiguring the device access paths configuration;
supplying a request signal to said attachment means for identifying the requested reconfiguration to the host system, wherein the host system checks path access allocation impact; and
upon receiving an approval signal from the host system, reconfiguring the subsystem access paths and devices by modifying the path access tables as set forth in the request signal.

36. In the method set forth in claim 35, further including the step of:
sending a one of said request signals to said attachment means for each access path for any device involved in the reconfiguration request.

37. In the method as set forth in claim 36, further including the steps of:
grouping access paths into logical related groups; and sending but one of said reconfiguration request signals to the attachment means over one of the access paths of the logical group to said attachment means.

38. In the method set forth in claim 36, wherein path one of said devices are interposed between the attachment means and others of said devices in said access paths; and when said reconfiguration request includes a path, one of said devices sending a request signal for all of said other devices coupled to paths in which said path device is operatively coupled.

39. The data processing system set forth in claim 3, wherein a controller is connected between one of said control units and one of said peripheral units, said reconfigure request means also responsive to a one of said received input commands, said received input commands indicating that said controller is to be maintained in an off-line condition, said communication means, said configuration control means, said response means, and said plurality of channel paths capable of removing and reestablishing access to said controller as described for removing and reestablishing access to a given one of said devices.

40. The data processing system set forth in claim 3, wherein said reconfiguration request means is also responsive to a one of said received input commands, said received input commands for inhibiting in said configuration maps any indication of the existence of at least one of said peripheral devices.

41. The data processing system set forth in claim 39, wherein said configuration table includes identification of quiescence or non-quiescence of said controller.

* * * * *

UNITED STATES PATENT AND TRADEMARK OFFICE
CERTIFICATE OF CORRECTION

PATENT NO. : 4,970,640

DATED : November 13, 1990

INVENTOR(S) : Brent C. Beardsley, Eugene P. Hefferon, Kenneth P. Lynch, Stephen W. Schimke, Lloyd R. Shipman, Susan M. Wethington It is certified that error appears in the above—identified patent and that said Letters Patent is hereby corrected as shown below:

Column 21, Line 61, "form" should read --from--.

Signed and Sealed this

Seventh Day of April, 1992

Attest:

HARRY F. MANBECK, JR.

Attesting Officer

Commissioner of Patents and Trademarks